June 14, 1966  D. M. ADAMS ET AL  3,256,033

SEAT POSITIONING APPARATUS

Filed Dec. 3, 1956  8 Sheets-Sheet 1

INVENTORS
Daniel M. Adams &
BY  Louis P. Garvey
E. W. Christen
ATTORNEY

INVENTORS
Daniel M. Adams &
BY Louis P. Garvey

ATTORNEY

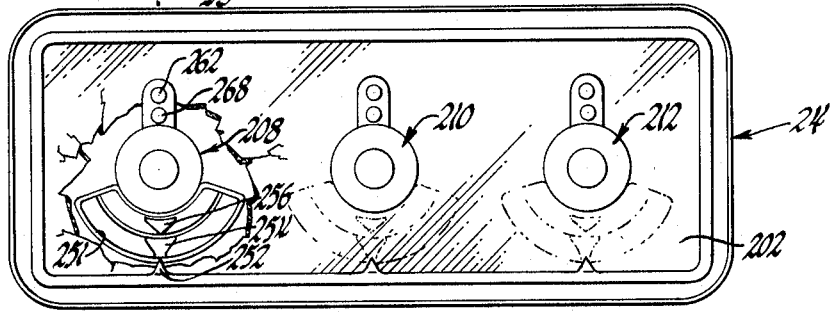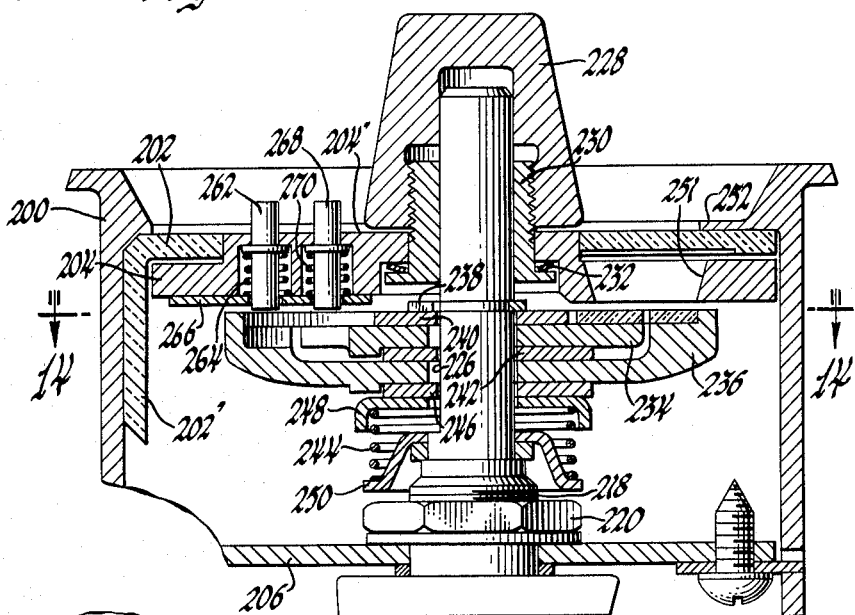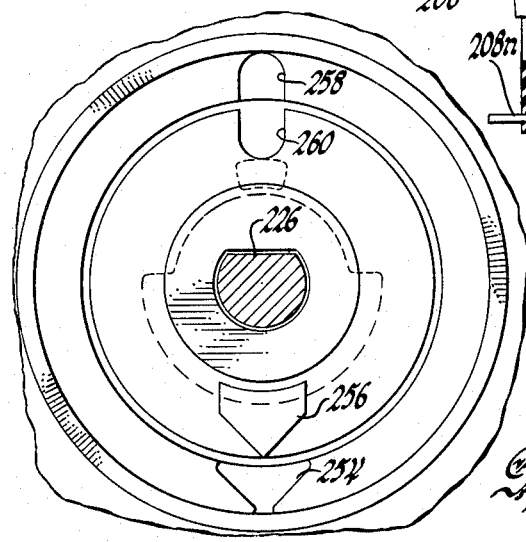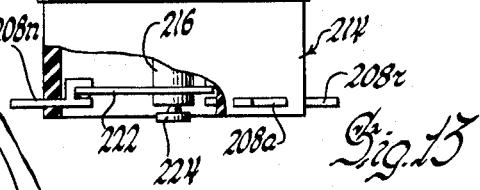

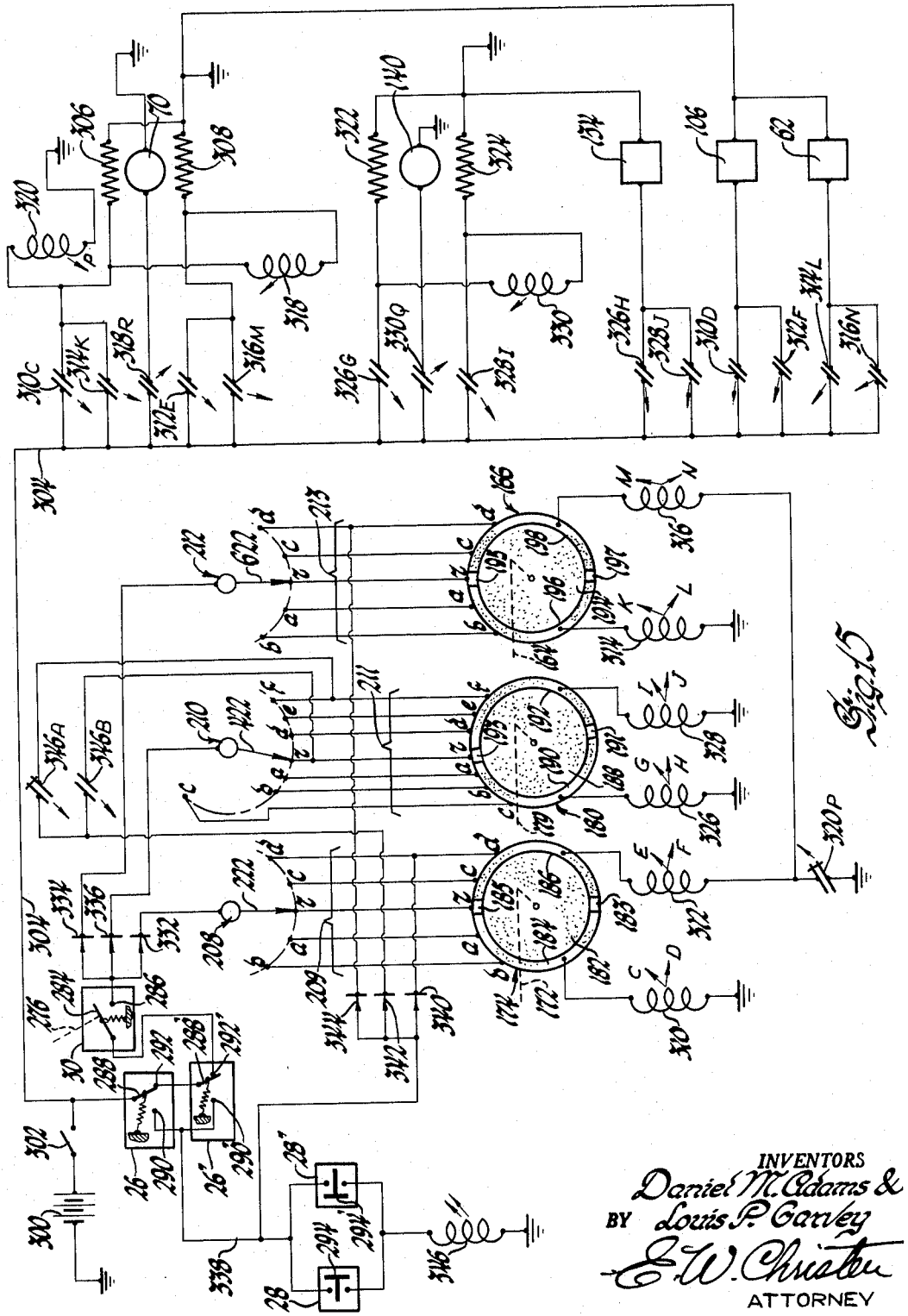

United States Patent Office 3,256,033
Patented June 14, 1966

3,256,033
SEAT POSITIONING APPARATUS
Daniel M. Adams and Louis P. Garvey, Birmingham, Mich., assignors to General Motors Corporation, Detroit, Mich., a corporation of Delaware
Filed Dec. 3, 1956, Ser. No. 625,716
6 Claims. (Cl. 296—68)

This invention relates to positional control systems and more particularly to automatically controlled vehicle seat positioning apparatus of the power-actuated type.

In accordance with this invention, automatic seat positioning for automotive vehicles is afforded having features of position selection and positional information storage or memory. In the realization of these features a position correspondence control system is utilized having a manual operable position selector device, a seat position responsive device, and control means responsive to positional disagreement thereof for causing energization of a power actuator to displace the seat to the selected position. The selector device is movable over a range of displacement corresponding to the range of adjustment of the seat positioning mechanism and is adapted to remain in the displaced position after release by the operator. Thus, the selector device affords a visual indication of the position selected and an operator may preselect with accuracy a favorite position which has been found to be most suitable.

Additionally, the inventive system affords automatic control of seat displacement to facilitate passenger entrance and exit from the vehicle. This is accomplished by utilizing override control means which interrupts the control influence of the position selector device and causes the power actuator to displace the seat from the selected position. One such feature which is employed with great advantage is the automatic displacement of the seat to a full rearward position in response to the opening of either of the front doors of the vehicle to increase the entrance or exit space in the front seat. As previously mentioned, however the selector device includes a feature of positional information storage and accordingly the seat may be returned automatically to a preselected position upon termination of the overriding control. The control influence may be restored to the position selector device upon closing of the front doors of the vehicle.

However, it has been found to be especially advantageous to restore the control influence to the selector device in response to a condition which occurs as a requisite to operation of the vehicle. For this purpose, a device operable incidentally to routine vehicle operating procedure, such as a switch operable in response to the weight of a passenger on the front seat, is provided to restore control influence to the position selector device.

This invention also provides automatic control to accommodate passenger exit and entrance to the rear seat of the vehicle. This feature is especially desirable in vehicle bodies of the type having no center pillar since the access space to the rear seat is largely determined by the position of the front seat of the vehicle. For this purpose, a manual control device may be provided in an easily accessible rear seat location to provide override control of the power actuator to cause the front seat to be displaced to a forward position during passenger exit or entry. It has been found especially desirable, however, to cause this overriding control feature to be dependent upon opening of both front vehicle doors thereby averting disturbance of the vehicle operator while the vehicle is in motion and ensuring that the front doors will not block the access space for a rear seat passenger. The front seat is returned to its rearward and downward position after operation of the rear seat override control by restoring the control influence to the aforementioned front door overriding control.

This invention is adaptable to seat positioning mechanisms of the power actuated type affording any desired degree of freedom or planes of adjustment. It is especially adapted for seat mechanisms of the so-called six-way type seat adjustment which affords three planes of adjustment; namely, fore and aft, front edge elevation and rear edge elevation. In accordance with this invention the adjustment of seat position is afforded by a separate control channel including a position selector device corresponding to each plane of adjustment. A different power actuator may be employed for each plane of adjustment or an actuator common to two or more planes of adjustment may be utilized. The control channels are interlocked in such a manner that simultaneous position selection in the different planes is permitted even though a common power actuator is used.

For the purpose of accommodating plural operators of the same vehicle, each of whom may have a different favorite seat position, this invention affords plural favorite position information storage by providing a separate position indicator for each individual operator. Thus an individual operator is relieved of the burden of remembering a position code or digit for each plane of adjustment corresponding to his favorite position. This is accomplished by providing each selector device with a single fixed index mark and a plurality of movable index marks each of which corresponds to the pre-selected position of a given individual operator.

A more complete understanding of this invention may be had from the detailed description which follows, taken with the accompanying drawings in which:

FIGURE 4a is a plan view of the seat position adjusting mechanism located at the right-hand end of the front seat.

FIGURE 12 is a plan view partially in section of the position selector means.

FIGURE 13 is a sectional view taken on lines 13—13 of FIGURE 12.

FIGURE 14 is a sectional view taken on lines 14—14 of FIGURE 13.

FIGURE 15 is a schematic diagram of electrical control circuit of the inventive system.

Figure 1:
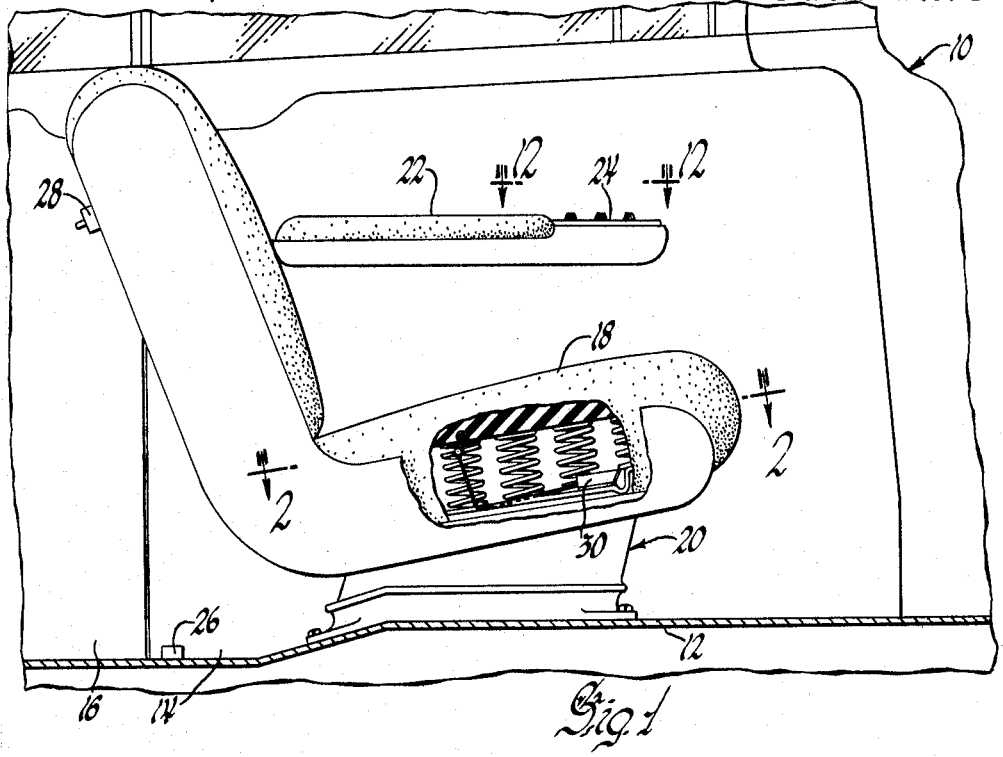
FIGURE 1 is a fragmentary side view of a vehicle body interior including an adjustable seat incorporating the inventive position control apparatus.
Figure 6:
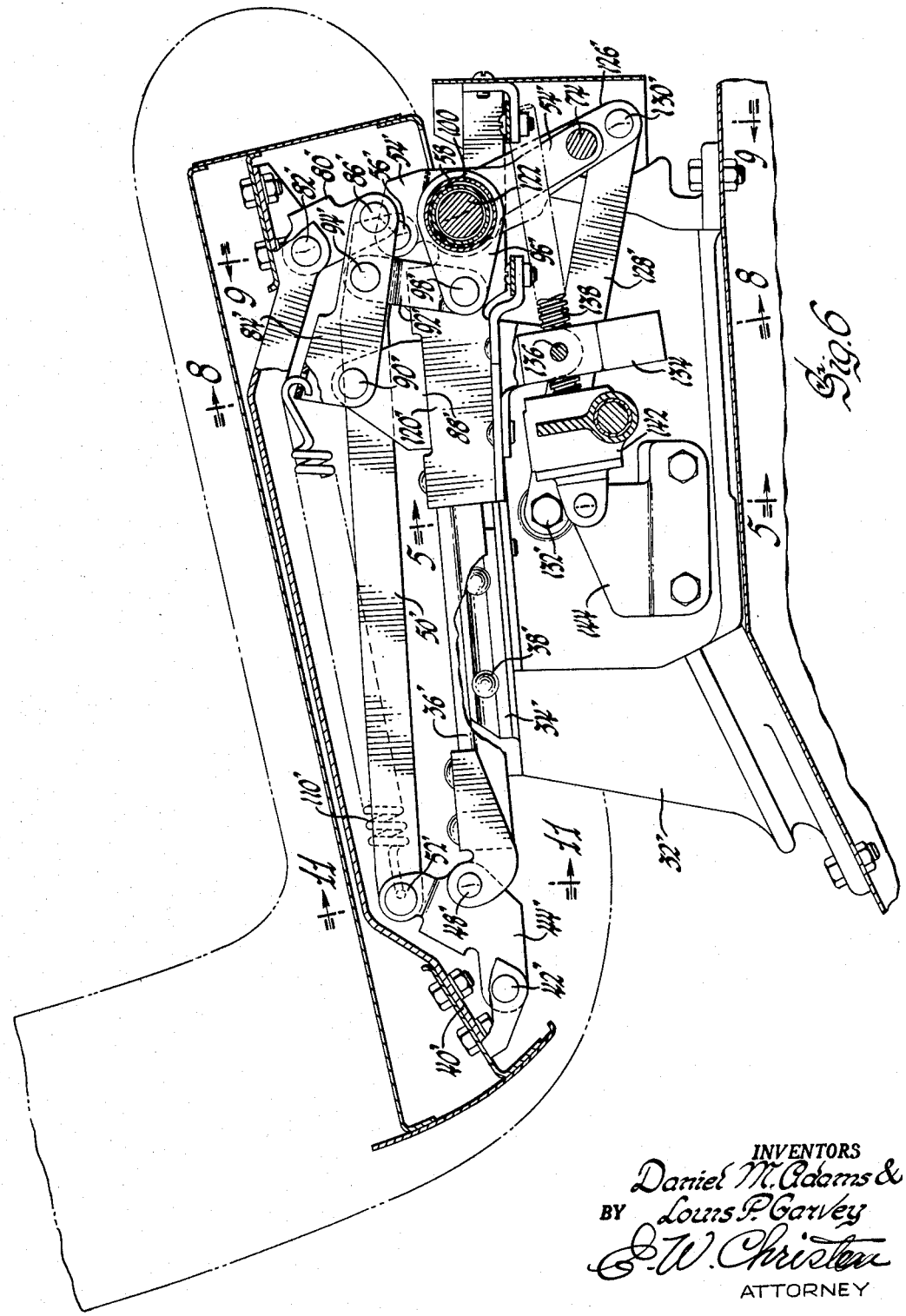
FIGURE 6 is a side view of the left-hand end of the seat position adjusting mechanism.
Figure 7:
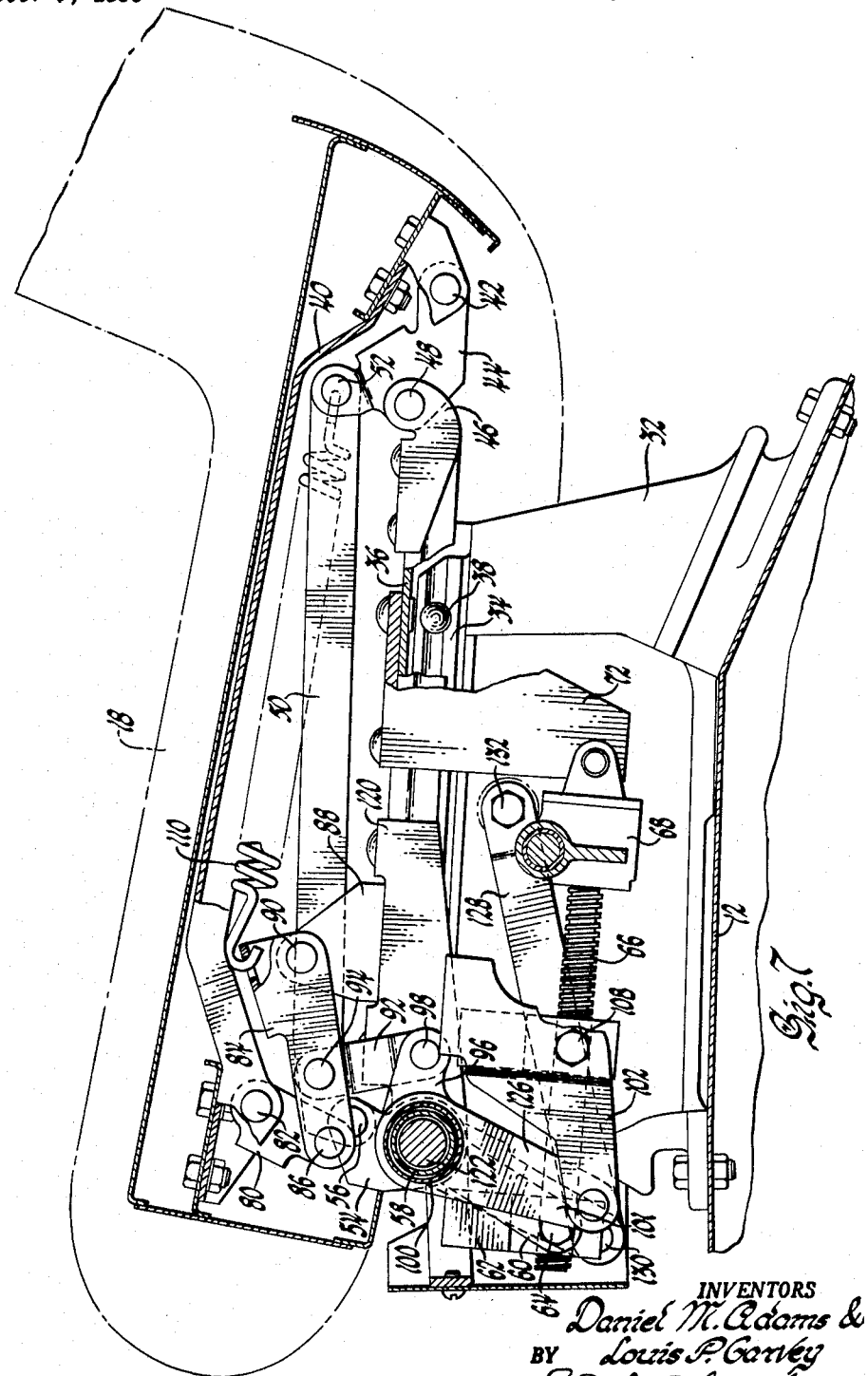
FIGURE 7 is a side view of the right-hand end of the seat position adjusting mechanism.

Referring now to the drawings there is shown an illustrative embodiment of the invention in an automatic control system for positioning a six-way type front seat in an automotive vehicle. There is shown in FIGURE 1 the general arrangement of the illustrative embodiment in a vehicle body 10, the interior of which is shown in a fragmentary view. The body 10 includes a floor panel 12 and a front door 14 on each side of the vehicle in the conventional manner and may also include a rear door 16 on each side of the vehicle. The front seat 18 disposed within the body is mounted upon the floor panel 12 through the intermediary of a seat position adjusting mechanism designated generally at 20. On the left-hand door of the vehicle body is mounted an arm rest 22 for the comfort and convenience of the seat occupant. A position selector mechanism 24 is suitably mounted on the arm rest 22 at a convenient location for manipulation by the vehicle operator to control the seat position adjusting mechanism 20. Additional control for the seat position adjusting mechanism is derived from a door actuated device or jamb switch 26 disposed in the rocker panel underneath the front door 14. Rear seat control of the position adjusting mechanism 20 may be exercised by operation of a manually operable switch 28 conveniently mounted on the back of the front seat 18. The seat position adjusting mechanism 20 comprises a seat displacement mechanism at the left-hand end of the seat as shown in FIGURE 6 and a substantially similar seat displacement mechanism at the right-hand end of the seat as shown in FIGURE 7. The right-hand end of the seat, as shown in FIGURE 7, is supported on the floor panel 12 by a seat base 32 upon which is mounted a longitudinal extending seat track 34. A seat carriage or slide 36 is disposed over the track 34 and supported thereon through the intermediary of spaced roller elements or balls 38. In a similar manner, the left-hand end of the seat, as shown in FIGURE 6, is supported on a base 32' having a track 34' mounted thereon which receives the seat carriage or slide 36' through the intermediary of the spaced balls 38'. Thus, the seat is mounted upon the carriages 36 and 36' and is adapted for fore and aft positional adjustment in the vehicle body by relative movement of the carriages 36 and 36' on the bases 32 and 32'.

Figure 4:
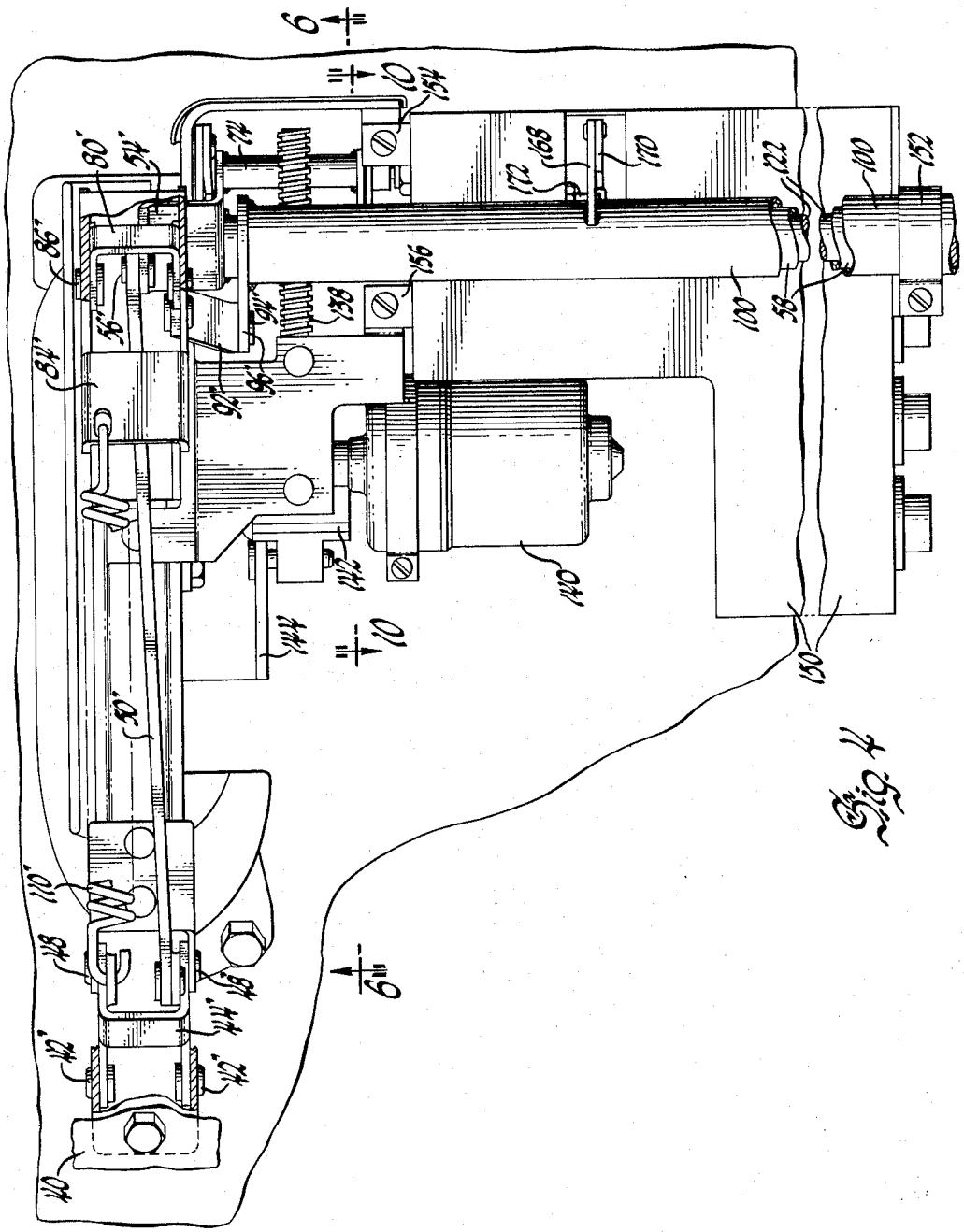
FIGURE 4 is a plan view of the seat position adjusting mechanism at the left-hand end of the front seat.

The seat position adjusting mechanism is adapted to provide elevation or vertical adjustment of the rear edge of the seat at the left-hand end by the mechanism illustrated in FIGURES 7 and 4a and at the right-hand end by the mechanism illustrated in FIGURES 4, 6, 9 and 11. As shown in FIGURE 7, the seat 18 includes a frame 40 which is mounted at its rear edge upon the rear elevation mechanism. This mechanism includes a pivotal connection of the frame 40 by a pivot pin 42 to a bell crank lever 44 which is in turn pivotally mounted upon the carriage through bracket 46 by a pivot pin 48. Rocking motion may be imparted to the bell crank lever 44 by a link 50 connected thereto by pivot pin 52 and extending forwardly to the lever 54. The lever 54 is connected at its upper end to the link 50 by the pivot pin 56 and is rigidly connected at a central offset portion to a transversely extending torque shaft 58. Depending from the torque shaft 58 is a set of levers 60 which are disposed at their lower ends astride a clutchable traveling nut 62 and connected pivotally thereto by the pins 64. The clutchable nut 62 is of the relay actuated type and is disposed upon the lead screw 66 which is driven through a suitable gear box 68 by an elevation power actuator or drive motor 70. The clutchable traveling nut 62 and others to be referred to hereinafter are suitably of the type disclosed in the Himka Patent 2,924,265, which was filed April 14, 1955, and assigned to the assignee of this application. The motor 70 and gear box 68 are supported upon a bracket 72 which in turn is mounted upon the carriage 36.

Figure 9:
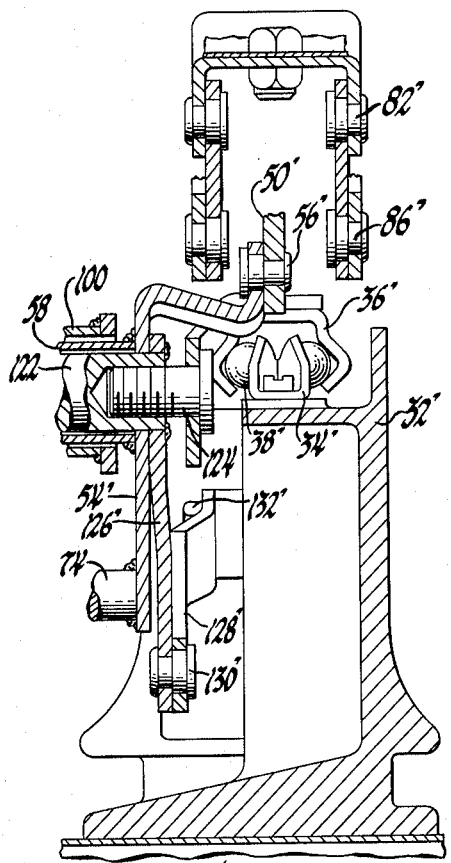
FIGURE 9 is a sectional view taken on lines 9—9 of FIGURE 6 showing the fore and aft drive train and the rear elevation drive train.

In a similar manner, the left-hand end of the seat 18 is mounted upon a rear elevation mechanism as shown in FIGURES 4, 6, 9 and 11. The seat frame 40 at its rear edge is mounted by pivot pins 42' upon the bell crank lever 44' which in turn is pivotally connected by pins 48' to the seat carriage 36'. Rocking motion may be imparted to the bell crank lever 44' through the link 50' which is connected thereto by the pin 52'. The forward end of the link 50' is connected to the upper end of a lever 54' by a pivot pin 56'. As shown in FIGURE 9, the lever 54' is secured at a central offset portion to the end of the sleeve shaft 58 and is driven thereby from the elevation drive motor 70 through the lead screw 66 and traveling nut 62. At a depending portion of the lever 54' is mounted a crank arm 74 which is utilized to transmit seat motion to a seat position responsive device which will be described subsequently. It will be apparent that the seat rear elevation may be adjusted by rotation of the elevation drive motor 70 in a selected direction. The rotational effort of the motor is transmitted through the lead screw 66 to the traveling nut 62 when the nut is in clutched engagement with the lead screw. The traveling nut 62 imparts rotary motion to the torque shaft 58 which in turn imparts rocking movement through the levers 54 and 54', links 50 and 50' to the bell crank levers 44 and 44', respectively. Thus the rear edge of the seat 18 is raised or lowered in accordance with the selected rotative direction of the drive motor 70.

In order to provide elevation or vertical adjustment of the front edge of the seat 18, a front elevation mechanism, as shown in FIGURES 4a and 7, for the right-hand end of the seat is provided and a corresponding front elevation mechanism shown in FIGURES 4, 6 and 9 is provided for the left-hand end of the seat. Referring now to FIGURE 7, the front elevation mechanism is connected with the seat frame 40 at its forward end by a pivotal link 80 and a pivot pin 82. The link 80 at its lower end is connected with a rocking lever 84 by a pivot pin 86. The rocking lever 84 is mounted by a pivot pin 90 upon a bracket 88 which in turn is fixed to the carriage 36. At an intermediate portion of the rocking lever 84, an offset link 92 is connected by a pivot pin 94 and depends therefrom. At its lower end the offset link 92 is connected with a crank arm 96 by a pivot pin 98. The crank arm 96 is nonrotatably secured to the torque sleeve shaft 100 which extends transversely in coaxial arrangement with the torque shaft 58. As illustrated in FIGURES 4a and 7, rotational effort for actuation of the linkage system just described is transmitted to the torque shaft 100 through a pair of crank arms 101 which are rigidly secured to the shaft 100. The crank arms 101 are pivotally connected at the lower ends to a bifurcated lever 102 by a set of pins 104. The bifurcated lever 102 is pivotally connected by a set of pins 108 at a remote point to the clutchable traveling nut 106. The traveling nut is mounted upon the lead screw 66 and is adapted for relay actuated clutch engagement therewith to translate the rotary motion of the lead screw to linear displacement of the lever 102. A similar front elevation mechanism is provided for the left-hand side of the seat as shown in FIGURES 4, 6 and 9. The seat frame 40 at its front portion is pivotally connected to the lever 80' by pivot pin 82' and thence is supported upon the rocking lever 84' by the pivot pin 86'. The rocking lever 84' is supported by the bracket 88' upon the seat carriage 36' by means of the pivot pin 90'. At an intermediate portion of the rocking lever 84' an offset link 92' is connected by a pivot pin 94' and is connected at its lower end by a pin 98' to a crank arm 96' which in turn is rigidly secured to the end of the torque shaft 100. It will be apparent that upward or downward positional adjustment of the front edge of the seat 18 of both the right-hand and left-hand ends is provided by the rotational effort of the elevation drive motor 70. This rotational effort in either direction is transmitted from the motor 70 through the lead screw 66 to the traveling nut 106 in a clutched condition and thence through the bifurcated lever 102 to crank arms 101 to the torque shaft 100. From the torque shaft the effort is transmitted through the crank arms 96 and 96', links 92 and 92', rocking levers 84 and 84' and links 80 and 80', respectively, to the seat frame 40.

In order to maintain a continuous effort urging both the seat front and seat rear edges to an upper position of adjustment, there are provided the tension springs 110 and 110'. The spring 110 extends between the rocking levers 84 and 44 of the front elevation and rear elevation mechanisms, respectively, tending to rock the remote ends of these levers upwardly to elevate the seat frame 40. Similarly, the spring 110', as shown in FIGURE 6, extends between the rocking levers 84' and 44' of the front and rear elevation mechanisms respectively tending to elevate the seat frame 40.

Figure 5:
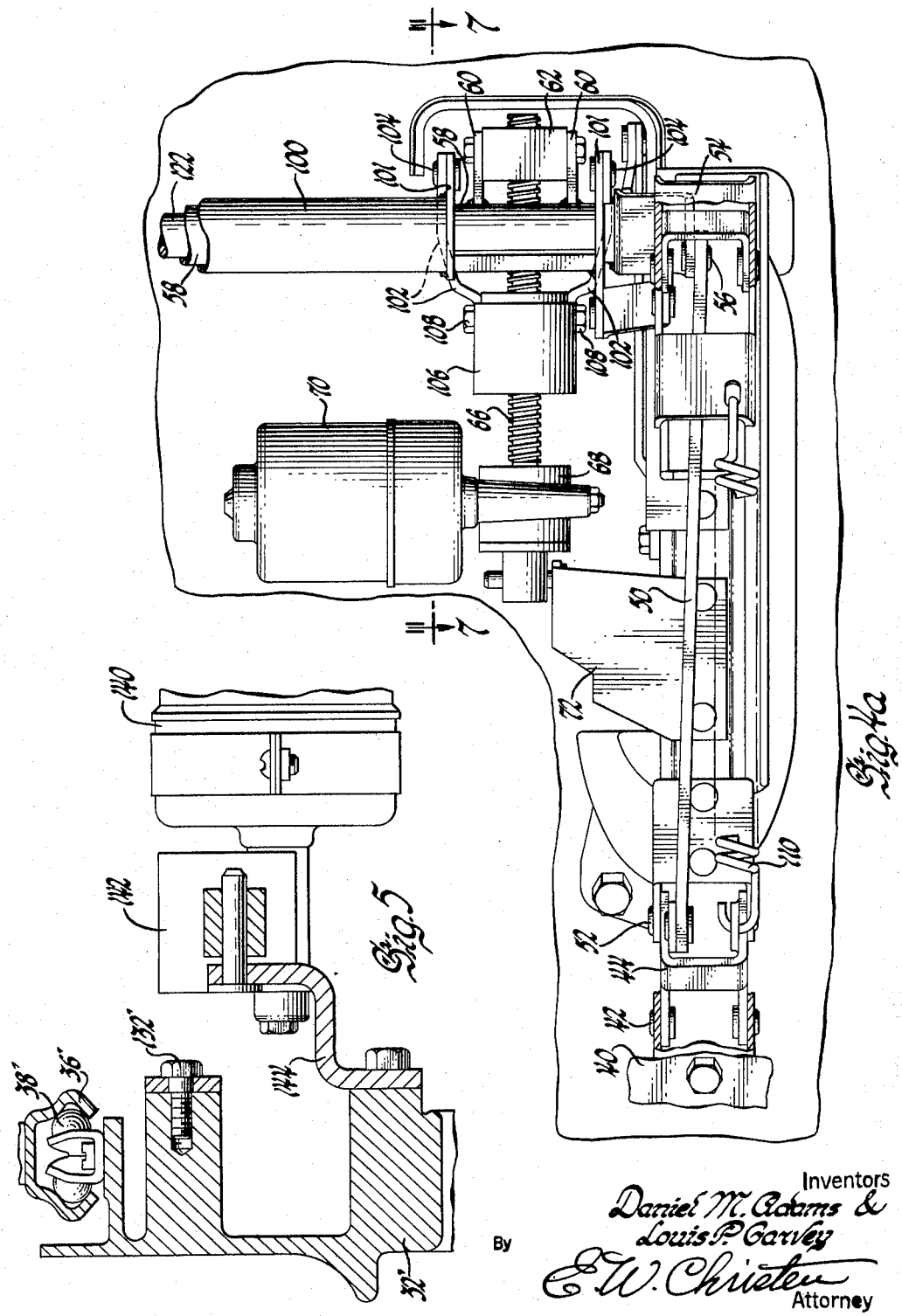
FIGURE 5 is a sectional view taken on lines 5—5 of FIGURE 6 of the left-hand end of the seat position adjusting mechanism showing the fore and aft drive motor.
Figure 8:
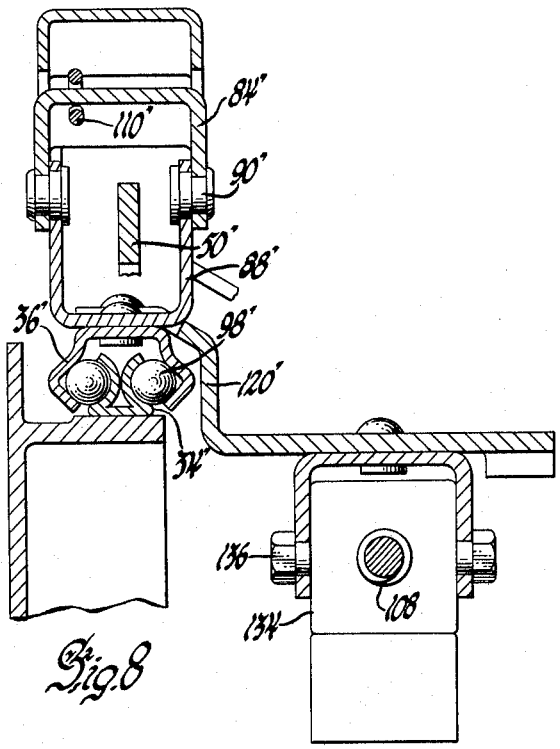
FIGURE 8 is a sectional view taken on lines 8—8 of FIGURE 6 of the seat position adjusting mechanism showing the fore and aft drive train.

Fore and aft positional adjustment is imparted to both sides of the seat 18 from a single fore and aft power actuator or drive motor 140 through a drive train for the left-hand end of the seat shown in FIGURES 4, 5, 6, 8 and 9 and through a drive train to the right-hand side of the seat shown in FIGURE 7. Referring now to FIGURE 6, the left-hand drive train comprises a bracket 120' rigidly secured to the carriage 36' for motion therewith. The bracket 120' is connected with the torque shaft 122, coaxially disposed within sleeve shaft 58, by a pivot pin 124 (see FIGURE 9). A crank arm 126' is rigidly secured to the end of the torque shaft 122 and is connected with a reaction lever 128' by a pivot pin 130'. The reaction lever 128' is secured to the seat base 32' by a pivot pin 132'. The bracket 120' is secured for actuation to the clutchable traveling nut 134 as shown in FIGURES 6 and 8 by a pivot pin 136. The traveling nut 134 is relay actuable for clutch engagement with the lead screw 138 upon which it is mounted. The lead screw is in turn driven by the fore and aft drive motor 140, as shown in FIGURE 4, through a gear box 142, as shown in FIGURES 4 and 6. The motor and gear box are supported by a bracket member 144 which is rigidly secured to the seat base 32' as shown in FIGURES 5 and 6. The fore and aft positioning mechanism for the right-hand side of the seat 18, as shown in FIGURE 7, comprises a bracket 120 rigidly secured to the seat carriage 36. The forward end of the bracket 120 is secured by a pivot pin, not shown, to the end of the torque shaft 122 in a manner similar to that shown in FIGURE 9. A crank arm 126 is rigidly secured to the end of torque shaft 122 and at its lower end is connected to the reaction member 128 by a pin 130. A reaction lever 128 at its most rearward end is secured to a seat base 32 by a pivot pin 132. It will be apparent that forward or rearward seat adjustment may be imparted by fore and aft drive motor 140 by rotation thereof in the appropriate direction. This motion is transmitted from the drive motor 140 to the gear box 142 and to the lead screw 138. With the traveling nut 134 in clutched engagement with the lead screw, forward or reverse translational movement will be imparted thereto depending on the direction of motor rotation. This motion is transmitted directly to the left-hand side of the seat through the connection of bracket 120' with the traveling nut 134 and the seat carriage 36'. This translational movement of the bracket 120' is transmitted to the torque shaft 122 through the connection of pivot pin 124'. Since the torque shaft 122 is connected by the crank arm 126' and the reaction lever 128' to the seat base 36' this translational movement of the torque shaft 122 is accompanied by rotational displacement of the torque shaft 122 about its own axis. Thus, rotational effort is transmitted thereby to the right-hand end of the seat and the crank arm 126. This rotational effort is transmitted through the reaction lever 128 to the fixed seat base 32. Consequently, this reaction to the rotational effort causes translation of the torque shaft 122 at the right-hand end of the seat and this translational effort is imparted to the seat carriage 36 through the bracket 120.

Figure 10:
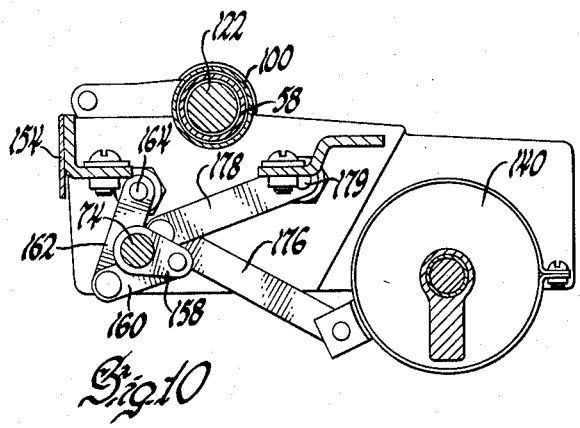
FIGURE 10 is a sectional view taken on lines 10—10 of FIGURE 4 showing the position responsive device.
Figure 11:
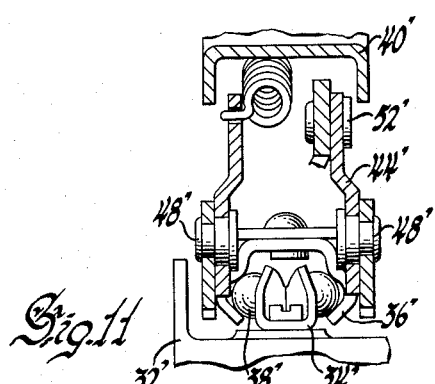
FIGURE 11 is a sectional view taken on lines 11—11 of FIGURE 6 showing the rear elevation drive train.

In order to sense the displacement of the seat 18 in each of its planes of adjustment there is provided a seat position responsive mechanism as shown in FIGURES 4, 10 and 15. Referring to FIGURE 4, the position responsive device comprises a housing 150 of L-shaped configuration suitably disposed adjacent the left-hand side of the seat. The housing 150 is supported from the torque shaft 100 by a bracket 152 and a forward extension of the bracket 120 by a bracket 154 and from a lateral extension thereof by a bracket 156. The housing 150 of the position responsive mechanism accommodates a rear elevation position responsive device or switch 166, a front elevation responsive switch 174 and a fore and aft position responsive switch 180, all of which are shown diagrammatically in FIGURE 15. The position responsive switches 174, 180 and 166 are all of similar construction and are of the multiple contact type having a bridging rotor contact. The front elevation responsive switch 174 comprises a stator having fixed contacts $r$, $a$, $b$, $c$ and $d$, and a rotor disk 182 of insulating material mounted upon the shaft 172 for rotation therewith. Shaft 172 is connected through links 168 and 170 to torque shaft 100 as shown in FIGURE 4. Disposed adjacent the periphery of the insulating disk 182 is a pair of arcuate conductive segments or bridging contacts 184 and 186. The bridging contacts are spaced apart from each other to form interposed nonconductive segments 183 and 185. Similarly, the position responsive switch 180 comprises a stator having fixed contacts $r$, $a$, $b$, $c$, $d$, $e$, and $f$, and a rotor disk 188 of insulating material mounted for rotation upon the shaft 179 and supporting a pair of conductive arcuate segments 190 and 192 which are spaced apart to form the non-conductive segments 191 and 193. Shaft 179 is connected with the motor 140 by the links 176 and 178 as shown in FIGURE 10. Likewise, the position responsive switch 166 comprises a stator having fixed contacts $r$, $a$, $b$, $c$ and $d$, and a rotor disk 194 of insulated material mounted for rotation with the shaft 164 and supporting a pair of conductive arcuate segments 196 and 198 which are spaced apart to form the non-conductive segments 195 and 197. Shaft 164 is connected with the torque shaft 58 by crank arm 54', and links 74, 158, 160 and 162 as shown in FIGURES 9 and 10.

In order to provide for automatic selection of the seat position there is provided a position selector mechanism 24 as shown in detail in FIGURES 12, 13, and 14. The selector mechanism comprises a body or casing 200 which is generally rectangular in configuration. The casing 200 is closed at the top by a transparent plate 202 which is seated against an internal shoulder on the casing 200. The transparent plate 202 is suitably formed with a depending flange 202' to permit illumination of the visible portion of the selector mechanism by edge lighting. A backing plate 204 of opaque material is disposed adjacent the transparent plate 202 and has a boss portion 204' extending therethrough. The bottom of the casing 200 is closed by a plate 206 which is secured thereto by any suitable means. The casing 200 accommodates a plurality of selector devices 208, 210 and 212 for independent position selection of the front elevation, fore and aft, and rear elevation respectively.

The selector switches 208, 210 and 212 are identical in construction and accordingly the description which will be given with respect to device 208 will be equally applicable to the others. The selector device 208 comprises a multiple contact switch having an axially extending operating shaft 216 which is generally cylindrical. The body or stator 214 of the switch includes a threaded bushing 218 coaxial with the shaft which extends through the bottom plate 206 and is secured in position by a lock nut 220. The switch is provided with multiple fixed contacts which may be identified as contacts $r$, $a$, $b$, $c$, and $d$, and which are circumferentially disposed upon the body or stator of the switch. A switch rotor contact 222 is mounted upon the operating shaft 216 for rotation therewith and is adapted in a conventional manner to selectively engage the fixed contacts. A centrally disposed fixed contact 224 is maintained in continuous engagement with the rotor contact 222 whereby the rotor contact is effective to bridge the fixed contact 224 and any selected one of the fixed contacts r, a, b, c, and d.

Manual operation of the selector switch is effected by an extension of the operating shaft 216 through the plates 204 and 202 to an operating knob 228. The operating knob is non-rotatably secured to the shaft by providing this extension of the shaft with an axially extending flat surface 226 which projects into a recess of corresponding configuration in the knob. The knob 228 is secured against axial displacement by a threaded bushing 230 disposed coaxially of the shaft and extending through the central portion 204' of the opaque plate against which it reacts through an interposed spring washer 232.

To provide a visual indication of the position of the selector device operating shaft there are provided a plurality of indicator rotors 234 and 236. The indicator rotors are preferably disposed in nested relation and thus may be of cup-shape configuration with progressively increasing diameters. The indicator rotors are disposed coaxially of the shaft 216 and are provided with a central circular opening to permit relative rotation of the shaft and rotors. To impart rotative effort to the indicator rotors, there is provided a yieldable coupling or clutch between the operating shaft and rotors. A plurality of clutch elements or friction disks 240, 242, and 246 are keyed by corresponding configuration to the shaft 216 and are disposed in engagement with the axial faces of the indicator rotors 234 and 236. The friction disk 240 is prevented from axial movement on the shaft 216 by a stop ring 238. The friction disk 246 is seated against an actuator plate 248 for transmiting axial pressure to the stack of clutch elements and indicator rotors. A clutch spring 244 is interposed between the actuator plate 248 and a reaction plate 250 to apply the clutch engaging pressure and thus the indicator rotors 234 and 236 are normally driven synchronously with the shaft rotation.

In order to provide a visual indication of the shaft position as indicated by rotors 234 and 236 the opaque plate 204 is provided with an arcuate window 251 in alignment with the periphery of the rotors. A fixed reference index mark 252 is disposed on the plate 204 at the midpoint of the window in a position corresponding to that of the fixed switch contact 208r. For cooperation with the fixed index mark 252 the indicator rotor 236 is provided with an index mark 254 and in a similar manner the rotor 234 is provided with an index mark 256. With the operating shaft 216 angularly positioned so that the switch rotor contact 222 is in engagement with the fixed contact 208r and the indicator rotors 234 and 236 angularly positioned so that the index marks 254 and 256 are opposite the fixed index mark 252, it may be said that the indicator rotors are in a primary reference position with respect to the operating shaft. Upon rotation of the shaft, the angular displacement of either index mark 254 or 256 from the fixed index mark 252 represents the angular position of the switch rotor contact 222.

In accordance with this invention, provision is made for establishing the indicator rotors in selectable secondary reference positions with respect to the operating shaft so that the selector device serves as an information storage means. This feature is especially desirable where two or more persons have different favorite seat positions. For the purpose of establishing such a favorite position, the selector device is provided with an indicator rotor stop mechanism corresponding to each indicator rotor. The stop mechanism for the indicator rotor 236 comprises a stop pin 262 extending through the boss 204' of the plate 204. The pin 262 is slidable in the plate 204 and maintained in a normally retracted position by a bias spring 264 which extends between a shouldered portion on the pin and a reaction plate 266. Similarly, a stop pin 268 corresponding to the indicator rotor 234 is slidable in the plate 204 and is retained in a retracted position by a bias spring 270.

The secondary reference position for the indicator rotor 234 is established by displacing the stop pin 268 into a corresponding recess 260, which is disposed in the rotor 234 opposite the index mark 256, and simultaneously operating the knob 228 to displace the switch rotor contact 222 to a selected position. The stop pin 268 is effective to prevent rotation of the indicator rotor 234 and consequently the clutch elements 240 and 242 slip relative to the rotor 234 resulting in relative angular displacement between the rotor index mark 256 and the switch rotor contact 222. When the stop pin 268 is released the rotor 234 is freely movable and may be displaced by the knob 228 by rotational effort imparted through the clutch disks 240 and 242. Accordingly, the favorite position thus selected may be re-established by merely rotating the knob 228 to a position in which the rotor index mark 256 is aligned with the fixed index mark 252. The secondary reference position may be established for the indicator rotor 236 in the same manner, by operation of stop pin 262 into recess 258, to represent the favorite position of another person.

Figure 2:
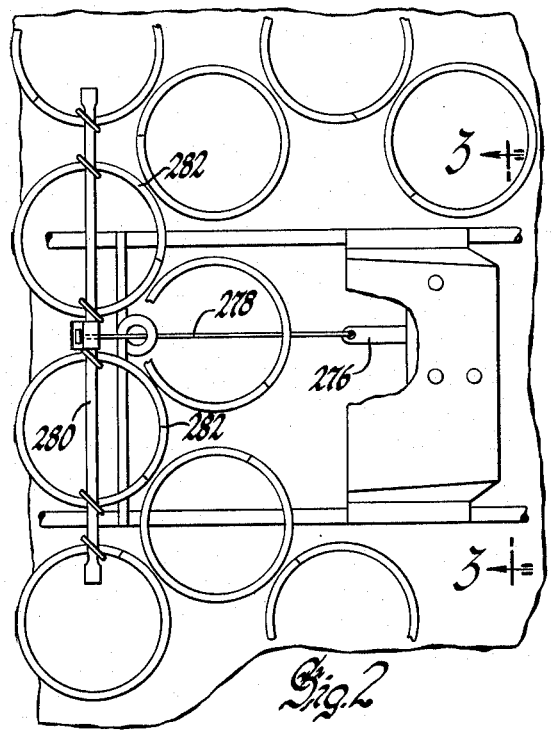
FIGURE 2 is a plan view taken on lines 2—2 of FIGURE 1 of a seat occupancy responsive device installed in the seat bottom.
Figure 3:
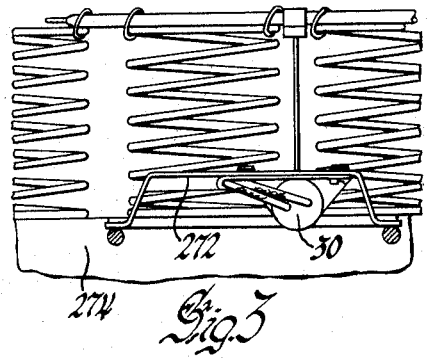
FIGURE 3 is a sectional view taken on lines 3—3 of FIGURE 2.

In order to provide control means effective to override the control influence of the position selector mechanism, certain condition responsive devices are utilized. As illustrated in FIGURES 1, 2 and 3 the switch 30 is disposed in the front seat compartment for manual actuation and is preferably a seat actuated switch responsive to front seat occupancy. The switch 30 is mounted upon a support bracket 272 which is suitably disposed beneath the vehicle operator's seat portion and is mounted upon the seat frame 274. The switch 30 includes an operating plunger 276 connected by a cable 278 to a rod 280 which in turn is secured to the coil springs 282 in the seat 18. As illustrated schematically in FIGURE 15, the switch 30 is of the single pole, single throw type having a movable contact 284 and a fixed contact 286. The movable contact 284 is spring-biased to the closed position by an internal spring. When the seat 18 is unoccupied the coil springs 282 are extended and the cable 278 is drawn taut thereby and accordingly switch 30 is normally open as illustrated. When seat 18 is occupied the weight of the occupant compresses the coil springs 282 causing slackening of the cable 278 and the switch 30 is closed.

In addition to the seat occupancy switch there is provided a pair of door responsive switches 26 and 26' as illustrated in FIGURES 1 and 15. The switch 26 is a single pole, double throw switch having a movable contact 288 movable between the fixed contacts 290 and 292. The movable contact 288 is spring-biased into engagement with the contact 290. When the left front door is closed the switch actuator is displaced by the door, causing the movable contact 288 to engage the fixed contact 292. Similarly, the door actuated switch 26' is disposed for actuation by closure of the right front door. The movable contact 288' is spring-biased into engagement with the fixed contact 290' and is displaced by the vehicle door in the closed position to engage the fixed contact 292'. An additional override control is provided by the rear seat manually operable switches 28 and 28' illustrated in FIGURES 1 and 15. These switches suitably take the form of push-button bridging contact switches. The switch 28 is mounted on the back of the front seat near the left-hand side within convenient reach of a passenger alighting from or entering the left rear door of the vehicle. Switch 28 comprises a movable contact 294 which is normally opened and adapted to bridge the fixed contacts of the switch. Similarly, the switch 28' is located on the back of the front seat near the right-hand side and comprises a movable contact 294' which is adapted, when closed, to bridge the fixed contacts of the switch.

The inventive control circuit for the seat position adjusting mechanism is shown schematically in FIGURE 15. The circuit is energized from a direct current power source or battery 300 having one terminal connected to a point of reference potential or ground and the other terminal connected through the energizing switch 302 to the main conductor or bus 304. Across the conductor 304 in parallel connection are the elevation drive motor 70, the fore and aft drive motor 140 and the relay actuated traveling nuts 134, 106 and 62 corresponding respectively to fore and aft adjustment, front elevation adjustment and rear elevation adjustment. The elevation drive motor 70 is suitably a shunt excited, reversible, direct current motor and includes an upward or forward field winding 306. The forward winding is connected between the conductor 304 and ground through the parallel connected normally open relay contacts 310C of relay 310 and the normally open relay contacts 314K of relay 314. Similarly, the reverse field winding 308 is connected between the power bus 304 and ground through the parallel connected normally open relay contacts 312E of relay 312 and 316M of relay 316. The armature of the elevation drive motor 70 is connected between the conductor 304 and ground through the normally open relay contacts 318R of the relay 318 which is connected in parallel with the field windings 306 and 308. The energizing coil of relay 318 is of high impedance relative to that of the field windings so that energization of one field winding will cause a negligibly small current flow through the other field winding and result in a negligible differential field effect. A sequence control relay 320 having normally closed relay contacts 320P is connected in parallel with the forward field winding 306 of the elevation drive motor 70.

The fore and aft drive motor 140 is also a shunt field, reversible, direct current motor having a forward field winding 322 and a reverse field winding 324. The forward field winding is connected between the conductor 304 and ground through normally open relay contacts 326G of the relay 326. The reverse field winding 324 is similarly connected between the conductor 304 and ground through the normally open relay contacts 328I of the relay 328. The armature of the drive motor 140 is connected between the conductor 304 and ground through the normally open relay contacts 330Q of the relay 330. The energizing winding of the relay 330 is connected in parallel with the field windings 322 and 324 and is of high impedance relative to that of each field winding to ensure negligible differential field effect when one of the field windings is energized.

The front elevation traveling nut 106 is connected for energization between the conductor 304 and ground through the parallel connected normally open relay contacts 310D of relay 310 and 312F of relay 312. In a similar manner the rear elevation traveling nut 62 is connected between the conductor 304 and ground through the normally open relay contacts 314L of relay 314 and the normally open relay contacts 316N of relay 316. The fore and aft traveling nut 134 is connected between the conductor 304 and ground through the normally open relay contacts 326H of relay 326 and the parallel connected relay contacts 328J of relay 328.

The selective energization of the drive motors and traveling nuts is provided by the front elevation control channel 209, the fore and aft control channel 211 and the rear elevation control channel 213 each of which, in conjunction with its respective drive motor, forms a position correspondence control system. The control channels 209, 211 and 213 are energized in parallel from the battery 300 through the series connection of switch 302, the door actuated switches 26 and 26′, the seat actuated switch 30, and thence in parallel through the reverse current blocking elements or diodes 332, 336 and 334 to the respective rotor contacts 222, 422 and 622 of channel selector switches 208, 210 and 212. In the front elevation control channel 209, the fixed contacts r, a, b, c and d are connected respectively through the conductors of channel 209 to the fixed contacts r, a, b, c and d of the position responsive switch 174. The rotor contact segment 184 corresponding to upward movement is connected through the energizing coil of relay 310 to ground. The rotor contact segment 186 corresponding to downward movement is connected through the energizing winding of relay 312 and the normally closed relay contacts 320P to ground.

In the rear elevation control channel 213 the fixed contacts r, a, b, c and d are connected respectively through the conductors of control channel 213 to the fixed contacts r, a, b, c and d of the rear elevation position responsive switch 166. The rotor contact segment 196 corresponding to upward movement is connected through the energizing winding of relay 314 to ground. The rotor contact segment 198 corresponding to downward movement is connected through the energizing winding of relay 316 and normally closed relay contacts 320p to ground.

The fore and aft control channel 211 includes the fixed contacts r, a, b, c, d, e and f connected respectively through the channel conductors to the corresponding fixed contacts r, a, b, c, d, e and f of the fore and aft position responsive switch 180. The rotor contact segment 190 corresponding to forward adjustment is connected to ground through the energizing winding of relay 326. The rotor contact segment 192 corresponding to rear seat adjustment is connected to ground through the energizing coil of the relay 328.

The control influence of the selector switches 208, 210 and 212 may be overridden by the condition responsive control circuits which include the door actuated switches 26 and 26′ and the manually actuated rear seat switches 28 and 28′. The door operated override control circuit in the illustrative embodiment extends from the battery 300 through switch 302 to the movable contact 288 of door actuated switch 26. This circuit may be completed to the conductor 338 through the fixed contact 290 of the switch 26 when the corresponding door is open, or if closed, through fixed contact 292 to the movable contact 288′ and thence fixed contact 290′ of switch 26′ when the corresponding door is open. The conductor 338 extends through the reverse current blocking diode 340 to the fixed contact d of switch 174 in the front elevation control channel 209 and through the diode 342 and normally closed relay contacts 346A to the fixed contact f of switch 180 in the fore and aft control channel 211 and through diode 344 to the fixed contact d of switch 166 in the rear elevation channel 213.

The rear seat manual control of the seat position is also energized from the conductor 338. This circuit includes the push-button switch 28 located in a left-hand position in the rear compartment connected in parallel with the push-button switch 28′ located at the right-hand portion of the rear compartment. These switches are connected between the conductor 338 and ground in series with the energizing coil of the relay 346 having relay contacts 346A and 346B. These relay contacts are connected between conductor 338 and the fore and aft control channel 211 with the normally closed contact 346A connected to fixed contact f of switch 180 and the normally open contact 346B connected to the contact r of switch 180.

In operation of the entire seat positioning apparatus of the illustrative embodiment, the automatic control system is energized by closure of the power switch 302. The different cycles of operation will be described with reference to various assumed operating conditions. First, consider the conditions in which the vehicle operator is occupying the front seat 18 and both front doors are closed. Accordingly, the left front door switch 26 will have its movable contact 288 in engagement with the fixed contact 292 and the right front door switch 26′ will have its movable contact 288′ in engagement with the fixed contact 292′. Additionally the weight of the operator will cause the switch 30 to be closed and hence voltage will be applied to each of the selector switches 208, 210 and 212. In the front elevation control channel 209 the selector switch rotor contact 222 is in engagement with the fixed contact $r$ and the supply voltage is transmitted to the corresponding fixed contact $r$ of the position responsive switch 174. This contact is in engagement with the non-conductive segment 185 of the switch rotor and accordingly the front elevation control channel circuit is interrupted. In a similar manner, in the rear elevation control channel, voltage is applied from the selector switch rotor contact 622 to the fixed contact $r$ and is transmitted through the corresponding conductor to the fixed contact $r$ of the rear elevation position responsive switch 166. The contact $r$ is in engagement with the non-conductive segment 195 of the switch rotor and the control circuit is interrupted thereby. Likewise, in the fore and aft control channel 211 the selector switch rotor contact 422 is in engagement with the fixed contact $r$ and the supply voltage is transmitted through the conductor to the corresponding fixed contact $r$ of the position responsive switch 130. The fixed contact $r$ is in engagement with the non-conductive segment 193 on the switch rotor and accordingly the fore and aft control channel circuit is interrupted. The conductor 304 is, of course, energized from the battery 300 but all of the relay contacts to the elevation drive motor 70, associated front elevation traveling nut 106 and rear elevation traveling nut 62 as well as the fore and aft drive motor 140 and associated traveling nut 134 remain open and these circuits are de-energized. Accordingly, the seat remains in its previously selected reference position.

Let it be assumed now that the operator desires to readjust the seat position to one which affords greater personal accommodation and which may be termed his favorite position. This is accomplished by manipulation of the selector switch 208 to displace the rotor contact 222 thereof in either a clockwise or counterclockwise direction depending upon whether the operator desires greater or less elevation of the front seat edge than that corresponding to the reference position. The extent of seat adjustment in the desired direction will be determined by the extent of displacement of the selector switch rotor contact. Assume that the rotor contact 222 is displaced into engagement with the fixed contact $c$. Thus, the supply voltage will be transmitted through the conductor to the fixed contact $c$ in the position responsive switch 174. Accordingly, the rotor contact segments 186 will be engaged thereby and will apply the supply voltage across the relay 312 and through the normally closed contacts 320P to ground. Energization of the relay 312 causes the relay contacts 312E of the elevation drive motor 70 to close and the relay contacts 312F of the front elevation traveling nut 106 to close. Thus the reverse field winding 308 of motor 70 is energized and the armature relay 318 thereacross is also energized. The armature contacts 318R are closed and the drive motor 70 is thereby energized to rotate in the reverse direction. At the same time, closure of the relay contacts 312F is effective to energize the relay actuated front elevation traveling nut 106. Accordingly, the seat is adjusted in front elevation as shown in FIGURE 7 by rotation of lead screw 66 and displacement of the traveling nut 106, bracket 102, crank arm 101, crank arm 96, link 92, rocking lever 84, and link 80. Similarly, this motion is transmitted to the other side of the seat through the torque shaft 100 and the corresponding elevation linkage system. The rotation of the torque shaft 100 corresponding to the vertical movement of the front edge of the seat is transmitted through the links 168 and 170 to the rotor shaft 172 of the position responsive switch 174 as shown in FIGURES 4 and 15. This causes displacement of the rotor of switch 174 in the clockwise direction until the non-conductive segment 185 thereon engages the energized contact $c$ to interrupt the front elevation control channel circuit. This circuit interruption results in de-energization of the relay 312 permitting the elevation drive motor relay contacts 312E to open de-energizing the reverse field winding and consequently the armature relay 318 to open the relay contacts 318R. Simultaneously, the relay contacts 312F are opened de-energizing the relay actuated front elevation traveling nut 106. Thus, the seat comes to rest in the front elevation position selected by the manipulation of this selector switch 208.

In a similar manner the rear elevation of the seat is selected by manipulation of the selector switch 212. Assume that the rotor contact 622 is displaced from the reference position contact $r$ in a counterclockwise direction to the fixed contact $a$. This energizes the relay 314 through the rotor contact segment 196 of the position responsive switch 166. Consequently, the elevation drive motor 70 is energized by a closure of the relay contacts 314K which completes the circuit through the forward field winding 306. Consequently, the armature relay 318 is energized and the contacts 318R are closed to complete the energizing circuit for the armature of the motor 70 and the motor commences rotation in the forward direction. Simultaneously, the energization of relay 314 causes the contacts 314L to close energizing the rear elevation traveling nut 62 and the rear elevation mechanism is actuated.

As shown in FIGURE 7, rotation of the lead screw 66 causes displacement of the crank arms 60 and 54, the link 50 and the bell crank lever 44 to impart vertical movement to the seat 18. Corresponding vertical movement is transmitted to the other side of the seat by the torque shaft 58 and the corresponding rear elevation mechanism. This movement is transmitted by the rod 74 to the follow-up linkage 158, 160 and 162, shown in FIGURE 10, to the rotor shaft 164 of the position responsive switch 166. Accordingly, the switch rotor is displaced until the non-conductive segment 195 engages the fixed contact $a$ to interrupt the rear elevation control channel circuit. This circuit interruption de-energizes the relay 314 and the contacts 314K are opened to de-energize the forward field winding of motor 70. This de-energization causes the armature relay 318 to be de-energized and the contacts 318R are opened to interrupt the armature circuit. Simultaneously, the contacts 314L are opened and the relay actuated rear elevation traveling nut 62 is de-energized. Thus, the seat comes to rest in the rear elevation position selected by manipulation of the rear elevation selector switch 212.

The seat adjustment in the fore and aft direction is effected in a similar manner by the manipulation of the fore and aft selector switch 210. Assume that the operator desires the seat to be displaced forwardly from the reference position, the selector switch rotor is displaced in a clockwise direction to a position, for example, in which it engages the fixed contact $b$. This completes an energizing circuit for the forward relay 326 through the rotor contact segment 190. Energization of the relay 326 causes energization for fore and aft motor 140 by closure of the relay contacts 326G to energize the forward field winding 322. Consequently, the armature relay 330 is energized and the relay contacts 330Q are closed to complete the armature circuit of the motor 140. Simultaneously, the energization of the relay 326 causes energization of the fore and aft traveling nut 134 by closure of the relay contacts 326H. Thus the motor 140 commences rotation in the forward direction and imparts movement to the fore and aft adjusting mechanism. This movement, as shown in FIGURE 6, is transmitted from the rotating lead screw 138 to the traveling nut 134 and thence through the bracket 120 to the seat carriage 36′. A corresponding movement is transmitted to the other side of the seat through the torque shaft 122 which is caused to rotate as a result of its translational movement by the connection thereof through the levers 126' and 128' with the seat base 32'. This rotative motion of the torque shaft 122 causes corresponding adjustment of the other side of the seat, as shown in FIGURE 4a, by rotation of the levers 126' and 128' about the forward end of the lever 128' which is secured at its rear end to the seat base 32. This fore and aft displacement of the seat is translated to rotary motion of the rotor shaft 179 of the position responsive switch 180 by the follow-up linkage including levers 176 and 178 interposed between the fixed casing of motor 140 and the rotor shaft 179. Thus the switch rotor is displaced until the non-conductive segment 193 engages the fixed contact b interrupting the fore and aft control channel circuit and de-energizing the forward relay 326. This causes de-energization of the fore and aft drive motor 140 by opening relay contacts 326G which interrupts the circuit of the forward field winding 322 and consequently de-energizes the armature relay 330 causing the relay contacts 330Q to open and de-energize the armature of motor 140. Simultaneously, de-energization of the forward relay 326 causes the relay contacts 326H to open and de-energizes the fore and aft traveling nut 134. Thus, the seat comes to rest at the selected position in the fore and aft direction.

It will be apparent that the position most suitable to the operator may be selected in any or all of the planes of seat adjustment in the manner just described by manipulation of the appropriate selector switch. It will be appreciated that the desired position may be established by displacement of the appropriate selector switch in either direction from the reference position and this displacement may be caused by incremental advancement which will cause the seat to follow the movement of the selector switch proportionally permitting the operator to hunt the position most suitable.

In accordance with this invention one or more persons may establish, in the selector switches, positional information which defines his favorite position and facilitates restoring the seat adjustment to this position from any displaced position. As shown in FIGURES 12, 13 and 14, this favorite position information storage is accomplished simultaneously with the selection and adjustment of the seat to the favorite position as described previously. The operator who wishes to store such information in the selector switches appropriates to his use one of the movable index marks 254 or 256, for example, mark 256. Prior to manipulation of control knob 228 for displacement of the selector switch rotor contact 222 the operator depresses the stop plunger 268 causing engagement thereof with the indicator rotor 234 in the recess 260. The indicator rotor 234 is thereby held in fixed position with the index mark 256 opposite the fixed reference index mark 252. In this condition, the selector knob 228 is rotated in either direction to any desired position until the desired seat position has been established. This movement of the selector knob 228 and operating shaft 216 relative to the indicator rotor 234 is permitted by slippage thereof with respect to the clutch disks 240 and 242. When the stop plunger 268 is released and withdrawn from the recess 260 the position information for the corresponding plane of adjustment is established in the selector switch. The knob 228 and operating shaft 216 may be displaced to any position without disturbing the information storage because the indicator rotor 234 is driven synchronously with the shaft 216 so long as the stop plunger 268 is withdrawn. Therefore, the operator who has utilized the position storage feature of indicator rotor 234 may re-establish his favorite seat position merely by manipulating the selector knob until the index mark 256 is positioned opposite the fixed reference index mark 252. This same procedure is, of course, followed to store position information in each of the selector switches 208, 210 and 212 corresponding to each plane of seat adjustment. In a similar manner another person may appropriate to his use the index mark 254 by operation of stop plunger 262 of each selector switch for information storage relative to his favorite position.

In general, the operation of the selector switches 208, 210 and 212 may be made in any sequence or direction and at any rate without interference or conflict of one of the control channels 209, 211 and 213 with any other. Subject to one restriction, the selector switches may be operated simultaneously as desired. This restriction is occasioned in the illustrative embodiment by reason of the use of a single drive motor for effecting elevation of both the front and rear edges of the seat. To secure this advantage and present conflict in the control circuits the upward movement of the seat, either at the front edge or the rear edge, is caused to predominate over the downward movement. Thus, as an adjustment is being effected and the front elevation selector switch 208 is displaced in a clockwise direction from its previous position the upward relay 310 will be energized to close relay contacts 310C to produce forward rotation of the drive motor 70. Consequently, the relay 320 is energized and the relay contacts 320P are open to interrupt the circuit of the energizing winding of the downward relay 316. Thus, if the rear elevation selector switch is displaced in a counterclockwise direction from its previous position to produce downward adjustment, for example, by engagement with the fixed contact d, the supply voltage will be applied to the rotor contact segment 198 but the energizing circuit for the downward relay 316 will be interrupted so long as contacts 320P remain open. As soon as the selected front elevation position has been released, the upward relay 310 in the front elevation channel will be de-energized and the forward energization of the elevation drive motor 70 will terminate. Consequently, the relay 320 will be de-energized and the relay contacts 320P will be reclosed. This permits the downward relay 316 in the rear elevation channel to be energized in accordance with the position selected and the elevation drive motor 70 will be energized for reverse rotation to effect the desired positioning. In the same manner if an upward adjustment of the rear elevation is selected by clockwise rotation of the selector switch 212 and simultaneously a downward adjustment of the front elevation is selected by counterclockwise rotation of the selector switch 208 the upward adjustment will predominate and occur first. Thus, the upward relay 314 in the rear elevation channel will be energized causing forward energization of drive motor 70 and energization of relay 320 to open the relay contacts 320P. The downward relay 312 in the front elevation channel cannot be energized until relay contacts 320P are closed upon completion of the upward adjustment of the rear elevation. It is thus apparent that simultaneous selection of opposite directions of adjustment of the front and rear elevation results, by operation of sequence relay 320 and contacts 320P, in sequential operation of the upward adjustment and downward adjustment.

When the front seat is occupied by an operator and is at rest in a selected or favorite position, opening of either front door causes the system to be energized to displace the seat to a rearward position to increase the exit space. Opening of the left door operates the door actuated switch 26 to displace the movable contact 288 from engagement with the fixed contact 292 into engagement with the fixed contact 290. Likewise, opening of the right front door operates switch 26' to displace the movable contact 288 from engagement with fixed contact 292' into contact with the fixed contact 290'. Accordingly, either action is effective to apply the supply voltage to conductor 338 and thence through the diode 340 to contact d of switch 174 in the front elevation channel 209. The supply voltage is also applied through diode 342 and normally closed relay contacts 346A to the contact f of switch 180 in the fore and aft control channel 211. Similarly, supply voltage is applied through diode 344 to contact d of switch 166 in the rear elevation control channel 213. Accordingly, there is simultaneous energization, in the control channels, of the downward relays 312 and 316 and the rearward relay 328 causing reverse energization of the drive motors 70 and 140 and energization of the traveling nuts 106, 62 and 134. When the seat has been adjusted to the rearmost and downmost position the position responsive switches 174, 180 and 166 interrupt the control channel circuits and de-energize the relays 312, 328 and 316 and hence the drive motors and traveling nuts. When the seat is in this position, there is ample exit space and when the operator alights from the vehicle the seat actuated switch 30 is opened. Closing of both front doors causes switches 26 and 26' to be closed against the fixed contacts 290 and 292, respectively. However, the seat switch 30 remains open and the selector switches 208, 210 and 212 remain de-energized and thus exercise no control over the seat position and the seat remains at rest.

If a passenger in the rear seat wishes to alight from the vehicle the rear door exit space may be increased by causing adjustment of the front seat. Subject to one of the front doors being open, and thus conductor 338 being energized, through either switch 26 or 26' the rear seat passenger need only close one of the push button switches 28 or 28'. This causes energization of the relay 346 which closes the normally open contacts 346B and opens the normally closed contacts 346A. Thus, the supply voltage is applied from conductor 338 to the diode 342 and through the relay contacts 346B to the contact $r$ of switch 180 in the fore and aft control channel. The forward relay 326 is energized causing the relay contacts 326G and 326H to close. Thus the fore and aft drive motor 140 and the associated traveling nut 134 are energized for forward adjustment. The seat will come to rest in the fore and aft plane of adjustment corresponding to the position of the fixed contact $r$ in the fore and aft control channel.

The seat position in the front and rear elevation planes of adjustment is unaffected by operation of either rear seat switches 28 or 28' since the relay 346 does not affect the circuits of the front and rear elevation control channels. When both rear seat switches 28 and 28' are released and opened, relay 346 is de-energized and relay contacts 346A are reclosed and relay contacts 346B are reopened. Thus, the supply voltages are reapplied in the fore and aft control channel to the conductor $f$. The fore and aft motor 140 is thereby energized in the reverse direction and the seat is displaced to its rearmost position corresponding to the contact $f$ and comes to rest.

When a front seat passenger opens the door to enter the vehicle the front seat is in the rearmost and downmost positions affording ample entry space, by virtue of the rest position of the seat resulting from the previously described sequence of operations which occur upon alighting from the vehicle. The front seat passenger may manipulate the selector switches 208, 210 and 212 to select his favorite position before or after entering the vehicle. In either event, control is not restored to the position correspondence system until the seat switch 30 is reclosed by the occupancy of the front seat and only upon closure of both front doors to connect the supply voltage through switches 26 and 26' and seat switch 30 to the selector switches 208, 210 and 212. This causes simultaneous energization of the elevation drive motor 70 and associated traveling nuts 106 and 62 and the fore and aft drive motor 140 and traveling nut 134 to displace the seat to a position corresponding to that of the selector switches. In the event a rear seat passenger wishes to enter the vehicle, greater access space may be had by manual closure of either rear seat switch 28 or 28'. If this occurs before both front doors are closed, the relay 346 will be energized to close relay contacts 346B and open relay contacts 346A. This results in a fore and aft adjustment of the seat to a position corresponding to the fixed contact $r$. When both rear seat switches 28 and 28' are open, relay 346 will be de-energized and the corresponding relay contacts 346B will be reopened and contacts 346A will be reclosed. If both front doors are closed upon the reopening of both rear seat switches 28 and 28' the control influence is restored to the position correspondence system energizing the selector switches 208, 210 and 212 and accordingly, the seat will be displaced to the favorite position represented thereby. If either front door remains open upon the reopening of both rear seat switches 28 and 28' the control influence will not be restored to the front door switches and the seat will be displaced to the rearmost and downmost positions. Upon closing of both front doors after this sequence of movement, the control influence will be restored to the position correspondence system and the seat will be displaced to the favorite position represented by the position of the selector switches.

Although the description of this invention has been given with respect to a particular embodiment, it is not to be construed in a limiting sense. Many variations and modifications within the spirit and scope of this invention will now occur to those skilled in the art. For a definition of the invention, reference is made to the appended claims.

What is claimed is:

1. In combination with a vehicle body including a seat and a passenger access door, said seat being mounted on the body by a seat position adjusting mechanism, a reversible motor connected with the mechanism for displacing the seat in the body, a selector switch having plural fixed contacts each corresponding to a selectable position of said mechanism and a movable contact, a position responsive switch having plural fixed contacts each connected with a different one of the selector switch fixed contacts and having a rotor driven by said mechanism, said rotor including a pair of conductive contact segments engageable with the position responsive switch fixed contacts and separated by a pair of nonconductive contacts engageable with one fixed contact at a time, one of the conductive segments operatively connected with the motor for forward energization thereof and the other of the conductive segments operatively connected with the motor for reverse energization thereof, a voltage source connectible to the selector switch movable contact whereby the motor is energized in response to positional disagreement of the selector switch and said mechanism to displace the mechanism to a selected position, and a door actuated switch connected between said voltage source and the selector switch movable contact and adapted to connect the voltage source to the selector switch movable contact when the door is closed and to a selected position responsive switch fixed contact when the door is open whereby the motor is energized to displace the mechanism to a predetermined position, and a seat switch connected between the voltage source and the selector switch movable contact and being closed in response to seat occupancy to render the selector switch effective to control energization of the motor to displace the mechanism to the selected position.

2. In combination with a vehicle body including a seat, said seat being mounted on the body by a seat position adjusting mechanism including a front elevating and a rear elevating mechanism, a power actuator connected with each of said elevating mechanisms, selector means including a front selector device and a rear selector device adapted to energize the power actuator to displace the seat in either elevation direction to a selected position said selector devices being effective to cause concurrent energization of the elevating mechanisms when the devices are operated in the same directions, and interlock means actuated by operation of one device in one direction to energize one of said elevating mechanisms, said interlock means being connected with the other device for preventing concurrent energization of said elevating mechanisms when said devices are operated in opposite directions, 3. In combination with a vehicle body, including a front and rear seat and respective front and rear passenger access doors, said front seat being mounted on the body by a seat position adjusting mechanism, a power actuator connected with the mechanism for displacing the seat fore and aft in the body, a selector device movable over a range of displacement corresponding to the range of adjustment of said mechanism, a position responsive device connected with the selector device and driven by said mechanism, control means connected with the position responsive device and responsive to positional disagreement of the devices for causing energization of the power actuator, a manually operable switch disposed adjacent said rear door and connected with the position responsive device for energizing the power actuator to cause displacement of the mechanism to a predetermined forward position, a source of power, and a front door actuated switch connected to the source of power and connectible alternately to the manually operable switch when the front door is open and to the selector device when the front door is closed.

4. In combination with a vehicle, a body including a seat and an access door mounted on said body, said seat being mounted on the body adjacent the door by a seat position adjusting mechanism, a power actuator connected with the mechanism for displacing the seat in the body, a position indicating selector device including a control element and an indicating element movable incrementally over a range of displacement corresponding to the range of adjustment of said mechanism, a position responsive device driven by said mechanism, means interconnecting the control element and position responsive device and being responsive to positional disagreement thereof for causing energization of the power actuator means to displace the seat in correspondence with the selector device, coupling means interposed between the control element and the indicator element causing concurrent displacement thereof, and manually actuable means for rendering said coupling ineffective to permit the indicator element to be in a reference position when the control element is in a different position corresponding to the favorite seat position of the operator.

5. In combination with a vehicle body including a seat and a passenger access door mounted on said body, said seat being mounted on the body adjacent the door by a seat position adjusting means including a fore and aft moving mechanism, a front elevating mechanism and a rear elevating mechanism, a reversible fore and aft motor and a reversible elevating motor, a different control channel corresponding to each of said mechanisms, each control channel including; a selector switch having plural fixed contacts each corresponding to a selectable position of the respective mechanism and a movable contact, a position responsive switch having plural fixed contacts each connected with a different one of the selector switch fixed contacts and having a rotor driven by the respective mechanism, said rotor including a pair of conductive contact segments engageable with the position responsive switch fixed contacts and separated by a pair of nonconductive contacts engageable with one fixed contact at a time, a forward relay connected between one of the conductive segments and a point of reference potential and a reverse relay connected between the other of the conductive segments and the point of reference potential, a fore and aft relay actuated clutch interposed between the fore and aft motor and mechanism and operatively connected with one relay, a front elevation clutch interposed between the elevation motor and front elevation mechanism and operatively connected with another of said relays, a rear elevation clutch interposed between the elevation motor and the rear elevation mechanism and operatively connected with the remaining one of said relays, a voltage source having one terminal connected to the point of reference potential and the other terminal connectible to each of said selector switch movable contacts whereby each clutch and motor is energized in response to positional disagreement of the respective selector and corresponding mechanism to displace the mechanisms to a selected position, a door actuated switch having a movable contact connected to said voltage source, a first fixed contact connected to each selector switch movable contact and adapted to connect the voltage source to said movable contacts when the door is closed, a second fixed contact connected to a selected fixed contact on each position responsive switch and adapted to connect the voltage source to said position responsive switches when said door is open, and a reverse current blocking means connected serially with each selector switch movable contact and with each of said selected fixed contacts of each position responsive device, whereby opening of the door causes energization of the power actuator to displace the seat to a predetermined position, said second fixed contact is connected through parallel circuits to a selected pair of fixed contacts of one position responsive device, normally closed relay contacts in one parallel circuit and normally open relay contacts in the other parallel circuit, a manually operable switch and an additional relay connected between said second fixed contact and the point of reference potential whereby closure of the manually operable switch and opening of the door energizes the power actuator to displace the seat to a different predetermined position.

6. In combination with a vehicle body including a seat and a passenger access door mounted on said body, said seat being mounted on the body adjacent the door by a seat position adjusting means including a fore and aft moving mechanism, a front elevating mechanism and a rear elevating mechanism, a reversible fore and aft motor including forward and reverse energizing windings, a reversible elevating motor, a fore and aft, front elevation and rear elevation control channel corresponding to the respective mechanisms, a selector switch in each control channel having plural fixed contacts each corresponding to a selectable position of the respective mechanism and a movable contact, a position responsive switch in each control channel having plural fixed contacts each connected with a different one of the fixed contacts of the selector switch in the same control channel and having a rotor driven by the respective mechanism, the rotor of each position responsive switch including a pair of conductive contact segments engageable with the position responsive switch fixed contacts and separated by a pair of nonconductive contacts engageable with one fixed contact at a time, a forward relay in each control channel connected between one of the conductive segments of the position responsive switch and a point of reference potential and a reverse relay in each control channel connected between the other of the conductive segments of the position responsive switch and the point of reference potential, a fore and aft relay actuated clutch interposed between the fore and aft motor and mechanism and operatively connected with said forward and reverse relays in the fore and aft control channel, a front elevation clutch interposed between the elevation motor and front elevation mechanism and operatively connected with said forward and reverse relays in the front elevation control channel, a rear elevation clutch interposed between the elevation motor and the rear elevation mechanism and operatively connected with said forward and reverse relays in the rear elevation control channel, a voltage source having one terminal connected to a point of reference potential and the other terminal connectible to each of said selector switch movable contacts whereby each clutch and motor is energized in response to positional disagreement of the respective selector and corresponding mechanism to displace the mechanism to a selected position, a first pair of normally open relay contacts interposed between the forward winding of said elevation motor and the said other terminal of the voltage source, one of said first pair being operably connected with the forward relay of the front elevation control channel and the other of said pair being operably connected with the forward relay of the rear elevation control channel, a second pair of normally open relay contacts interposed between said other terminal of the voltage source and the reverse winding of said elevation motor, one of said second pair being operatively connected with the reverse relay of the front elevation channel and the other of said second pair being operably connected with the reverse relay of the rear elevation channel, an interlocking relay connected in parallel with one of said elevation motor windings, and normally closed relay contacts connected between the relays corresponding to the other of said elevation motor windings and said point of reference potential.

References Cited by the Examiner
UNITED STATES PATENTS

| | | | |
|---|---|---|---|
| 2,036,118 | 3/1936 | Carr | 296—68 |
| 2,117,409 | 5/1938 | Dorsey | 296—68 |
| 2,436,068 | 2/1948 | Hegy | 313—467 X |
| 2,474,999 | 7/1949 | Allison | 200—6 |
| 2,606,626 | 8/1952 | Meyer | 180—82 |
| 2,696,403 | 12/1954 | Baugh | 296—65 |
| 2,717,344 | 9/1955 | Jackson | 318—31 |
| 2,754,379 | 7/1956 | Winter | 200—6 |
| 2,809,862 | 10/1957 | Daniels | 296—65 X |
| 2,823,949 | 2/1958 | Williams et al. | 296—65 |
| 2,829,002 | 4/1958 | Leavengood et al. | 296—65 |

FOREIGN PATENTS 848,454  9/1952  Germany.

BENJAMIN HERSH, *Primary Examiner.*
PHILIP ARNOLD, WILLIAM J. KANOF, *Examiners.*
J. O. HARRELL, R. C. PODWIL, *Assistant Examiners.*